US010334821B2

(12) United States Patent
Yun

(10) Patent No.: US 10,334,821 B2
(45) Date of Patent: Jul. 2, 2019

(54) RAINCOAT FOR DOGS

(71) Applicant: Yeu Hoon Yun, Los Angeles, CA (US)

(72) Inventor: Yeu Hoon Yun, Los Angeles, CA (US)

( * ) Notice: Subject to any disclaimer, the term of this patent is extended or adjusted under 35 U.S.C. 154(b) by 278 days.

(21) Appl. No.: 15/254,405

(22) Filed: Sep. 1, 2016

(65) Prior Publication Data

US 2018/0055008 A1   Mar. 1, 2018

(51) Int. Cl.
*A01K 29/00* (2006.01)
*A01K 13/00* (2006.01)

(52) U.S. Cl.
CPC .................... *A01K 13/006* (2013.01)

(58) Field of Classification Search
USPC ....... 119/850, 855, 858, 856; D30/145, 144; 54/79.1–79.4, 80.1–80.5
See application file for complete search history.

(56) References Cited

U.S. PATENT DOCUMENTS

| 918,796 | A | * | 4/1909 | Tilden | |
| D142,815 | S | * | 11/1945 | Ardmore | D30/145 |
| 3,108,568 | A | * | 10/1963 | Whitney | A01K 13/001 |
| | | | | | 119/174 |
| 3,150,641 | A | | 9/1964 | Kesh | |
| 3,742,679 | A | | 7/1973 | Jordan | |
| 3,918,238 | A | | 11/1975 | Iozzio | |
| 4,385,592 | A | * | 5/1983 | Goldstein | A01K 15/04 |
| | | | | | 119/815 |
| 5,003,756 | A | * | 4/1991 | Mazzotta, Sr. | A01K 27/007 |
| | | | | | 119/654 |
| 5,137,508 | A | * | 8/1992 | Engman | A61D 9/00 |
| | | | | | 119/850 |
| 5,996,537 | A | | 12/1999 | Caditz | |
| 6,058,890 | A | | 5/2000 | Harrell | |
| 6,267,083 | B1 | * | 7/2001 | Chimienti | A01K 13/006 |
| | | | | | 119/850 |
| 8,413,670 | B1 | | 4/2013 | Richardson, Jr. | |
| 8,617,091 | B2 | * | 12/2013 | Brannon | A61D 9/00 |
| | | | | | 119/850 |
| 9,374,983 | B1 | * | 6/2016 | Kuehr | A01K 13/006 |
| D777,996 | S | * | 1/2017 | Thitz | D30/145 |
| D780,383 | S | * | 2/2017 | Kuehr | A01K 13/006 |
| | | | | | D30/145 |
| 2003/0029389 | A1 | * | 2/2003 | Sporn | A01K 13/006 |
| | | | | | 119/850 |
| 2004/0134447 | A1 | | 7/2004 | Seymour | |
| 2009/0025119 | A1 | | 1/2009 | Nespor | |
| 2009/0308330 | A1 | | 12/2009 | Kajanoff | |
| 2010/0115895 | A1 | | 5/2010 | Prill | |
| 2010/0206247 | A1 | | 8/2010 | Cheng | |

(Continued)

*Primary Examiner* — Andrea M Valenti
(74) *Attorney, Agent, or Firm* — Heedong Chae; Lucem, PC

(57) ABSTRACT

A raincoat for dogs includes a body portion that substantially covers and extends from a rump to a head of a dog, wherein the body portion is waterproof and the body portion includes a front edge, first and second front side edges, first and second side edges and a rear edge; a visor fixedly attached to the front edge of the body portion; first and second pliable metal wires that are parallel to each other and attached to the body portion along a spinal line of the dog, wherein the first and second pliable metal wires substantially extend from the front edge to the rear edge of the body portion; and a fastener for fastening and securing the raincoat to the dog.

20 Claims, 15 Drawing Sheets

(56) References Cited

U.S. PATENT DOCUMENTS

| | | | |
|---|---|---|---|
| 2011/0155077 A1* | 6/2011 | Hurwitz | A01K 13/006 |
| | | | 119/850 |
| 2014/0224189 A1 | 8/2014 | Hamilton | |
| 2014/0299073 A1* | 10/2014 | Batista | A01K 27/002 |
| | | | 119/856 |
| 2015/0342716 A1* | 12/2015 | Haught | A61D 9/00 |
| | | | 119/855 |

* cited by examiner

RAINCOAT FOR DOGS

FIELD OF THE INVENTION

The present invention relates to a raincoat for dogs, and more particularly; the raincoat for dogs comprised of a body portion and a visor having pliable metal wires. The pliable metal wires allow the body portion and the visor of the raincoat to be deformable—capable of change of form—but maintain its deformed shape. Thus, the deferrable raincoat for dogs prevents the raincoat or the visor from hanging or dangling from a dog's head or ears, and dogs feel more comfortable with the deferrable raincoat when dogs are walking and running under a rainy weather condition.

BACKGROUND OF THE INVENTION

Raincoats for dogs are useful when walking a dog during a rain or storm. Raincoats prevent or protect dogs from wetting their body with rain or water. Otherwise, a wet dog may shake and spatter to wet surroundings.

However, conventional raincoats are usually constructed of multi-piece parts, bulky cap or hood and many straps for securing the raincoat to a dog. Such bulky raincoats become even bulkier and heavier when they become wet with water.

Furthermore, conventional cap or hood of raincoats is constructed to cover a head and/or ears of dogs to protect against rainy weather or cold weather for dogs. The cap or hood of raincoats -usually hangs and dangles down a dog's ears and interferes with a dog's vision or makes a dog uncomfortable. Thus, dogs feel uncomfortable or irritated by such raincoats, and they may try to escape from such bulky raincoat having a cap or hood.

Therefore, to solve the above problems, there is a need for a raincoat for dogs comprised of a body portion and a visor having pliable metal wires for preventing the raincoat from hanging or dangling down a dog's head or ears. This invention is directed to solve these problems and satisfy the long-felt need.

SUMMARY OF THE INVENTION

The present invention provides a raincoat for dogs comprised of a body portion and a visor having pliable metal wires. The pliable metal wires allow the body portion and the visor of raincoat to be deformable but maintain deformed shapes. Thus, the deformable raincoat for dogs prevents the raincoat from hanging or dangling down a dog's ears or interfering with a dog's vision. Wearing the raincoat of the present invention, dogs feel more comfortable when walking or running outside in rainy weather condition.

The object of the present invention is to provide a raincoat for dogs, comprising a body portion that substantially covers and extends from a rump to a head of a dog, wherein the body portion is waterproof and the body portion comprises a front edge, first arid second front side edges, first and second side edges and a rear edge; a visor fixedly attached to the front edge of the body portion; first and second pliable metal wires that are parallel to each other and attached to the body portion along a spinal line of the dog, wherein the first and second pliable metal wires substantially extend from the front edge to the rear edge of the body portion; and a fastening means for fastening and securing the raincoat to the dog.

Another object of the present invention is to provide a raincoat for dogs, comprising a body portion that substantially covers and extends from a rump to a head of a dog, wherein the body portion is waterproof and the body portion comprises a front edge, first and second front side edges, and a rear edge; a visor fixedly attached to the front edge of the body portion; a pliable metal wire that is attached to the body portion along a spinal line of the dog, wherein the pliable metal wire substantially extends from the front edge to the rear edge of the body portion; and a fastening means for fastening and securing the raincoat to the dog.

The advantages of the present invention are: (1) the present invention provides a raincoat for dogs comprised of a body portion and a visor having pliable metal wires that are deformable; (2) the pliable wire of the present invention is plastically deformable and capable of change of form and thus, it can prevent the raincoat from hanging or dangling from a dog's head or ears, and dogs feel more Comfortable with the deformable raincoat when dogs are walking and running under a rainy weather condition; (3) because of the pliable metal wire(s), the raincoat can be easily adjusted and maintain its shapes; (4) the body portion and the visor of the present invention are supported by pliable metal wires and the visor can maintain its shapes not to bother a dog's ears; (5) the present invention has a access opening and D-ring structures so that a leash or harness can be easily connected to the raincoat; (6) the present invention has a simple structure, but is very effective in making a dog feel comfortable in the raincoat when walking or running in rain; (7) the fastening structure of the present invention is convenient and thus, the raincoat is easy to put on and take off, but it is securely fastened to a dog; (8) the present invention is inexpensive to manufacture; and (9) the raincoat of the present invention is easy and convenient to adjust and snugly fits various sizes of dogs.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Figure 1:
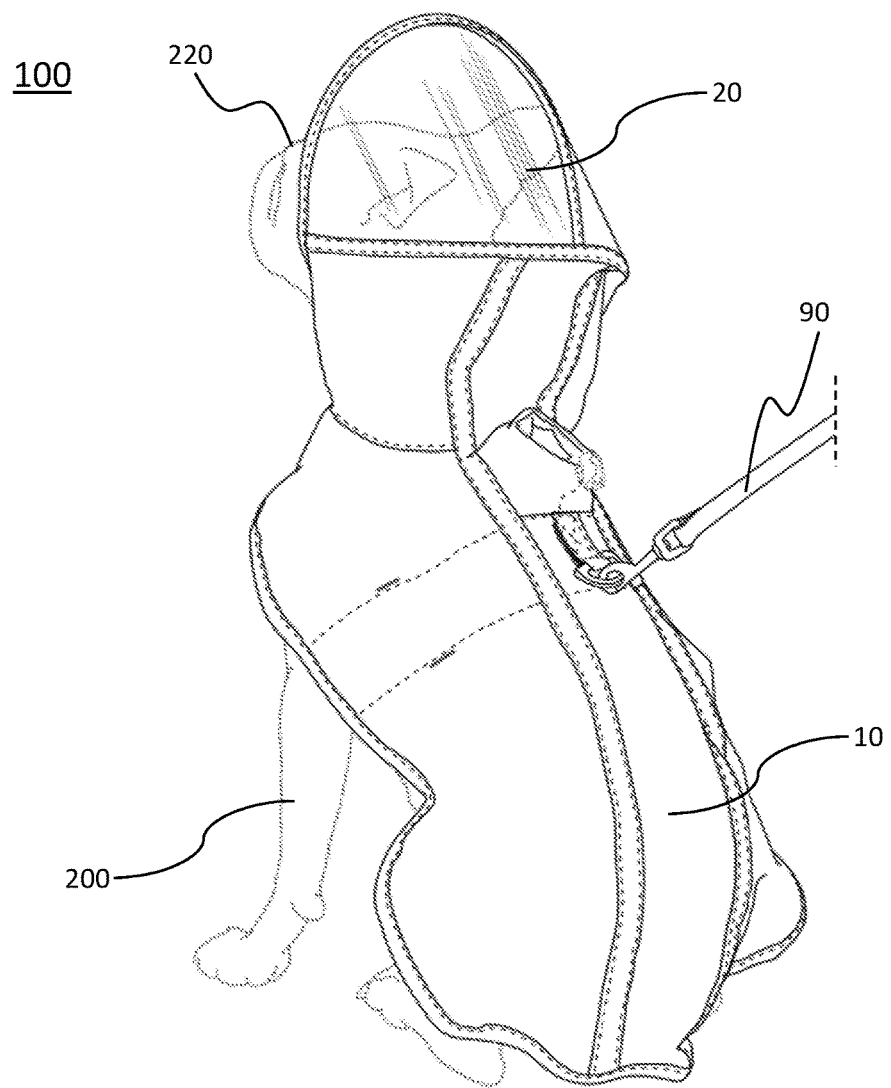
FIG. 1 shows a perspective view of a raincoat for dogs worn by a dog according to one embodiment of the present invention.

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

The present invention provides a raincoat (100) for dogs (200) comprised of a body portion (10) and a visor (20) having pliable metal wires (31, 32, 60). The pliable metal wires (31, 32, 60) allow the body portion (10) and the visor (20) of raincoat (100) to be plastically deformable or capable of change in forms, and then maintain its changed shape. The pliable metal wires (31, 32, 60) may be made from metal, metal wire, metal alloy or the likes. The first and second pliable metal wires (31, 32) helps the visor (20) conveniently change in between open position and closed position, and after such change in position, the first and second pliable metal wires (31, 32) maintain its changed position. In addition, the third pliable metal wire (60) helps the visor (20) maintain its wide open shape in order not to bother a dog's ears and make the dog feel comfortable even when the visor (20) is in a closed position. Thus, The pliable metal wires (31, 32, 60) of the present invention can prevent the raincoat (100) from hanging or dangling from a dog's head or ears, and dogs feel more comfortable with the deformable raincoat when dogs are walking and running under a rainy weather condition.

Figure 2:
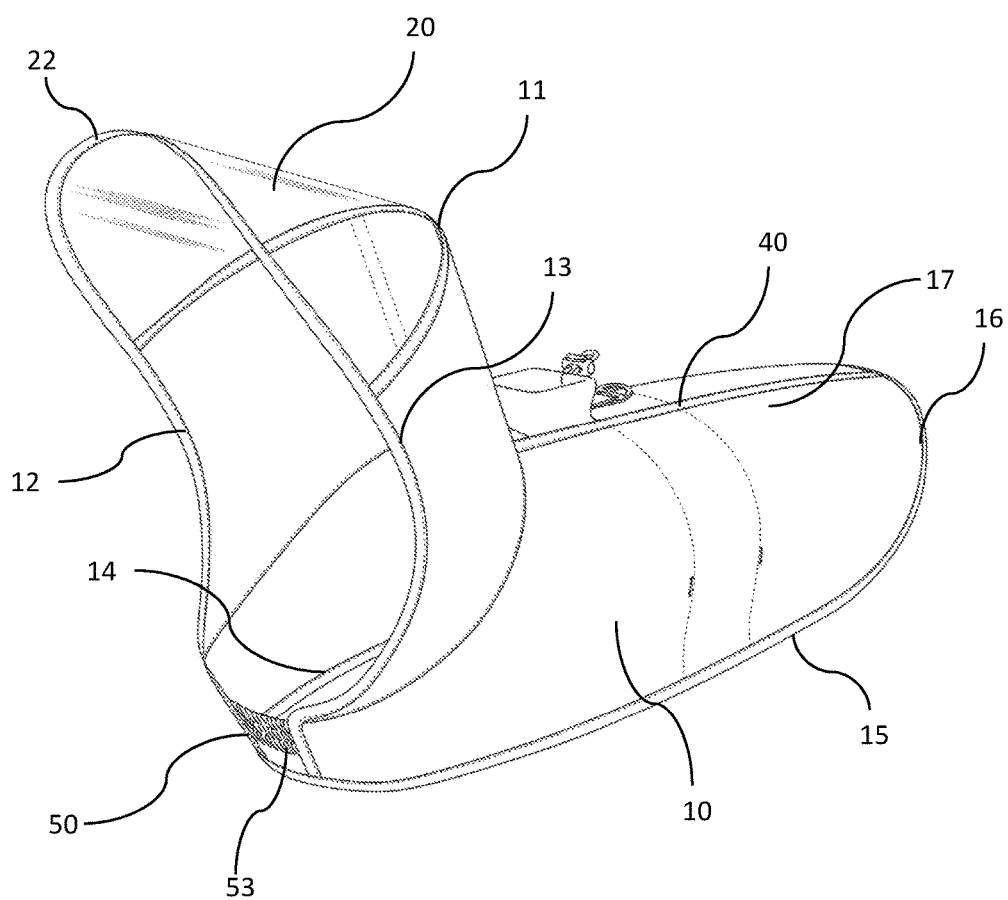
FIG. 2 shows a front perspective view of the raincoat for dogs according to one embodiment of the present invention.
Figure 3:
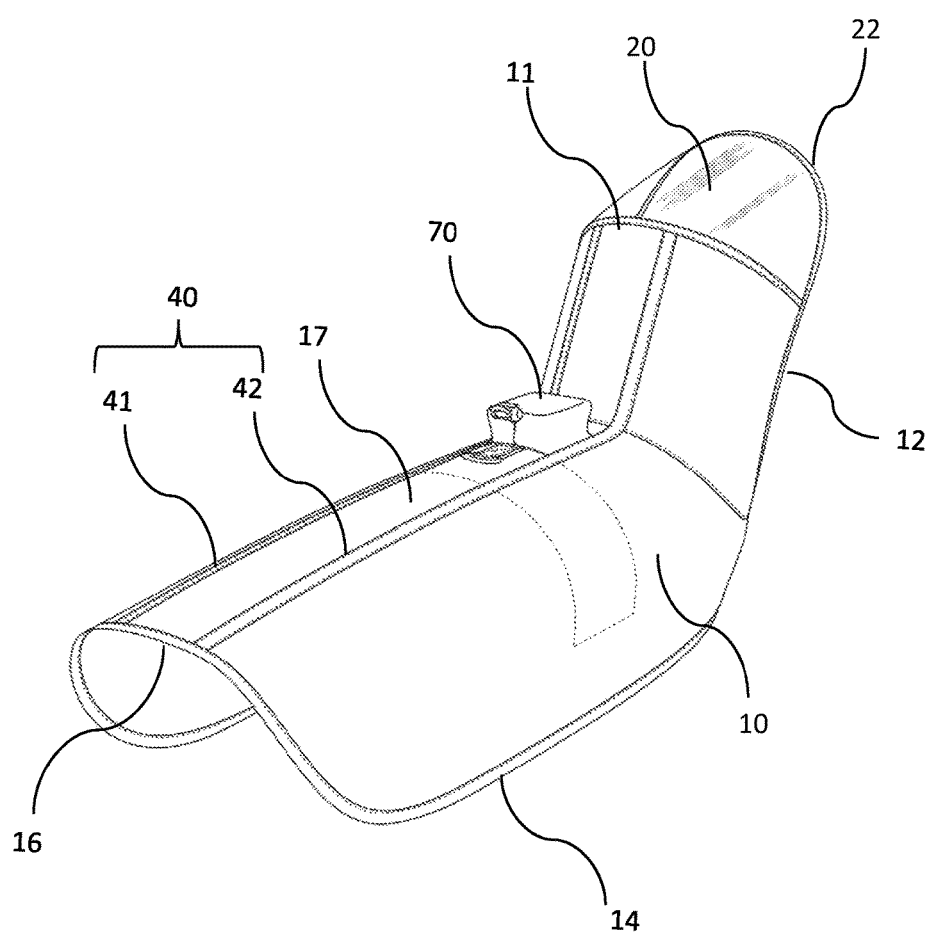
FIG. 3 shows a rear perspective view of the raincoat for dogs.
Figure 8:
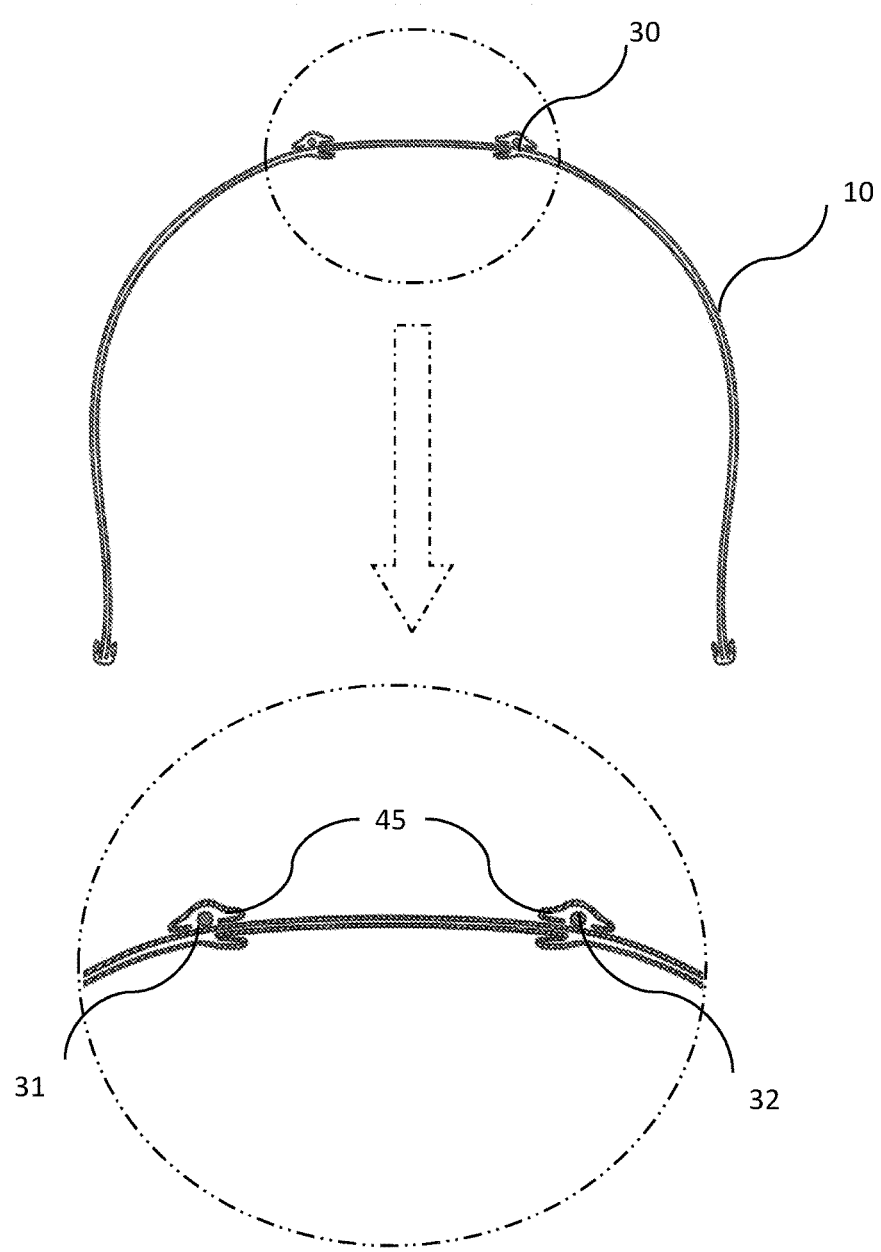
FIG. 8 shows a cross-sectional view of the body portion of the raincoat showing first and second pliable metal wires of the body portion.

FIG. 1 shows a perspective view of the raincoat (100) worn by a dog. FIGS. 2 and 3 respectively show front and rear perspective views of the raincoat (100) for dogs according to one embodiment of the present invention. FIG. 8 shows a cross-sectional view of the body portion (10) of the raincoat (100) having first and second pliable metal wires (31, 32) of the body portion (10).

Figure 15:
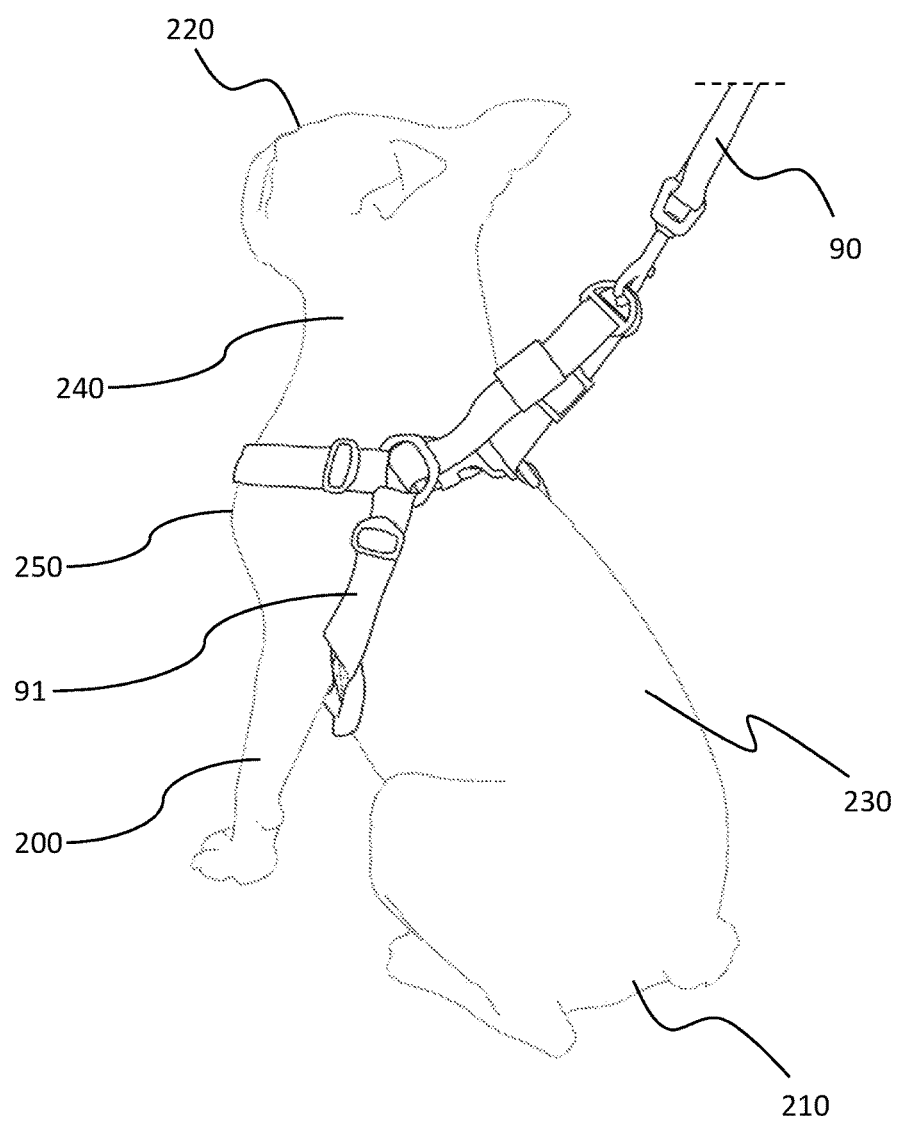
FIG. 15 shows a perspective view of the dog wearing a harness having a leash connected thereto.

The raincoat (100) for dogs (200) includes a body portion (10) that substantially covers and may extend from a rump (210) to a head (220) of a dog (200), wherein the body portion (10) may be waterproof and the body portion (10) comprises a front edge (11), first and second front side edges (12 and 13), first and second side edges (14 and 15) and a rear edge (16); a visor (20) fixedly attached to the front edge (11) of the body portion (10); first and second pliable metal wires (31 and 32) that are parallel to each other and is attached to the body portion (10) along a spinal line (230) of the dog (200) that is shown in FIG. 15, wherein the first and second pliable metal wires (31 and 32) substantially may extend from the front edge (11) of to the rear edge (16) of the body portion (10); and a fastening means (50) for fastening and securing the raincoat (100) to the dog (200). The body portion (10) is made from waterproof or water-repellent material and the visor (20) is made from transparent or translucent material. The visor (20) may be pulled down or lifted up and the first and second pliable metal wires (31 and 32) maintain such pulled-down or lifted-up positions. The first and second pliable metal wires (31 and 32) may be attached to the body portion (10) directly or indirectly. The first and second pliable metal wires (31 and 32) may be attached to the body portion (10) fixedly or movably.

The raincoat (108) is primarily designed for dogs but may be used for other animals.

As shown in FIGS. 3 and 8, the raincoat (100) for dogs may further include first and second sleeves (41 and 42) that substantially extend from the front edge (11) to the rear edge (16) of the body portion (10). The first and second pliable metal wires (31 and 32) are respectively inserted into the first and second sleeves (41 and 42).

Furthermore, the first and second sleeves (41 and 42) may be formed by stitching strips (45) of waterproof material to the body portion. Preferably, the straps (45) may be coated with reflective material for safety of a dog walking or running at night.

Figure 4:
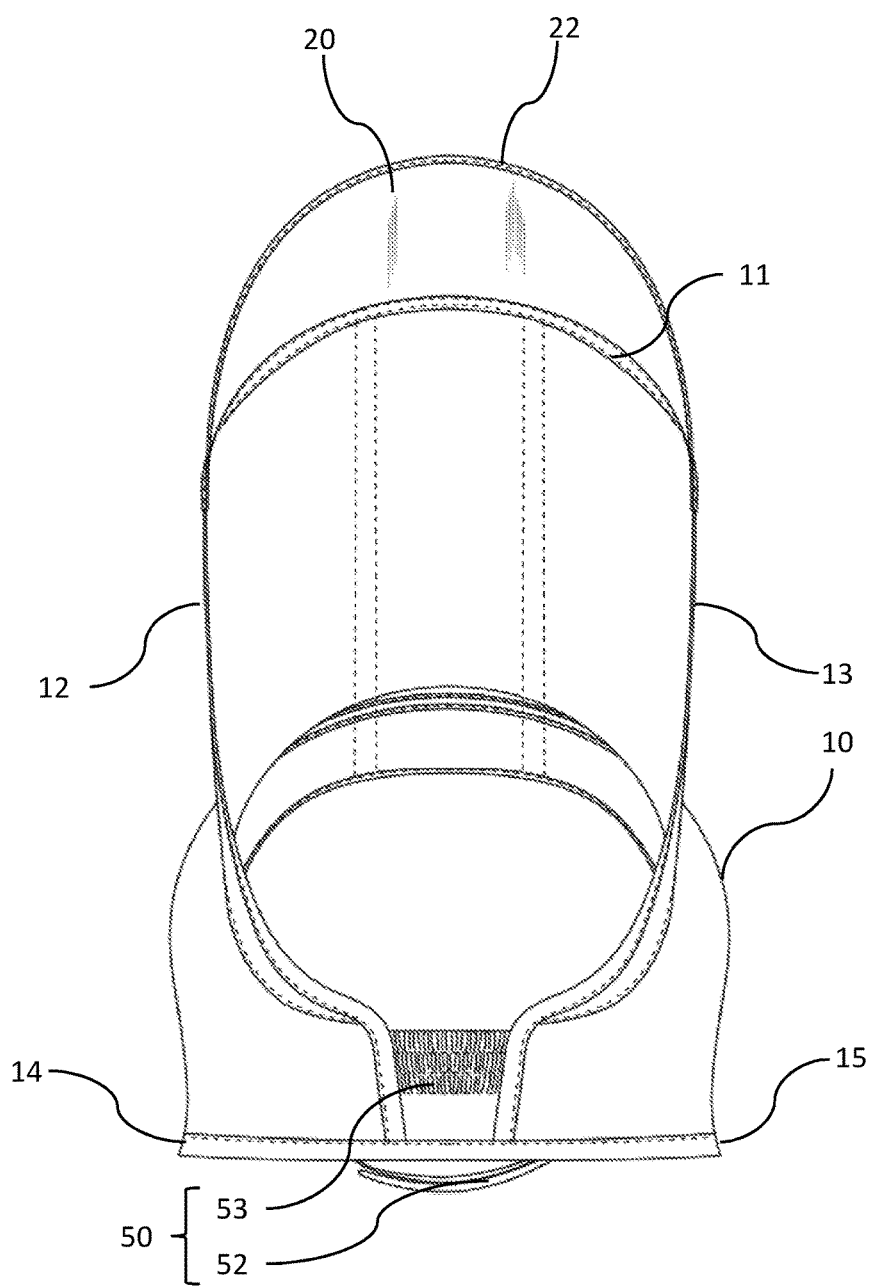
FIG. 4 shows a front elevation view of the raincoat for dogs.
Figure 9:
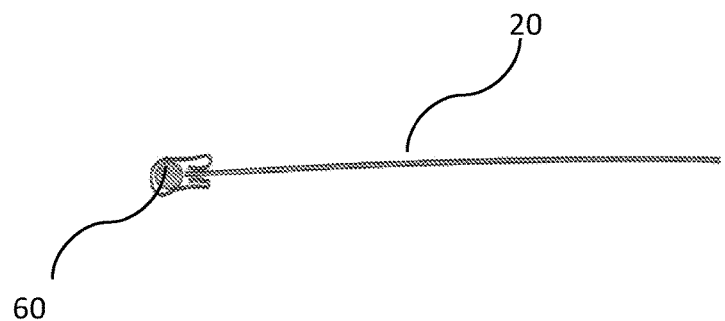
FIG. 9 shows a cross-sectional view of the visor of the raincoat showing a third pliable metal wire of the visor.

FIG. 4 shows a front elevation view of the raincoat (100) for dogs and FIG. 9 shows a cross-sectional view of a visor (20) of the raincoat (100) showing a third pliable metal wire (60) of the visor (20). A third pliable metal wire (60) may be attached to the body portion (10) and the visor (20) substantially along the rim (22) of the visor (20) and the first and second front side edges (12 and 13) of the body portion (10). The third pliable metal wire (60) may be attached to the body portion (10) directly or indirectly, or fixedly or movably.

Preferably, the first and second pliable metal wires (31 and 32) are attached on both sides of the spinal line of the dog (200) and substantially equally spaced apart from the spinal line of the dog (200).

Here, "pliable" means "plastically deformable" and metal wire may be made of metal, metal alloy, coated wire or the likes, including wire coated with a bendable material, such as a plastic. The pliable metal wire (31, 32, 60) is plastically deformable and capable of change of forms and maintains such changed forms.

Figure 5:
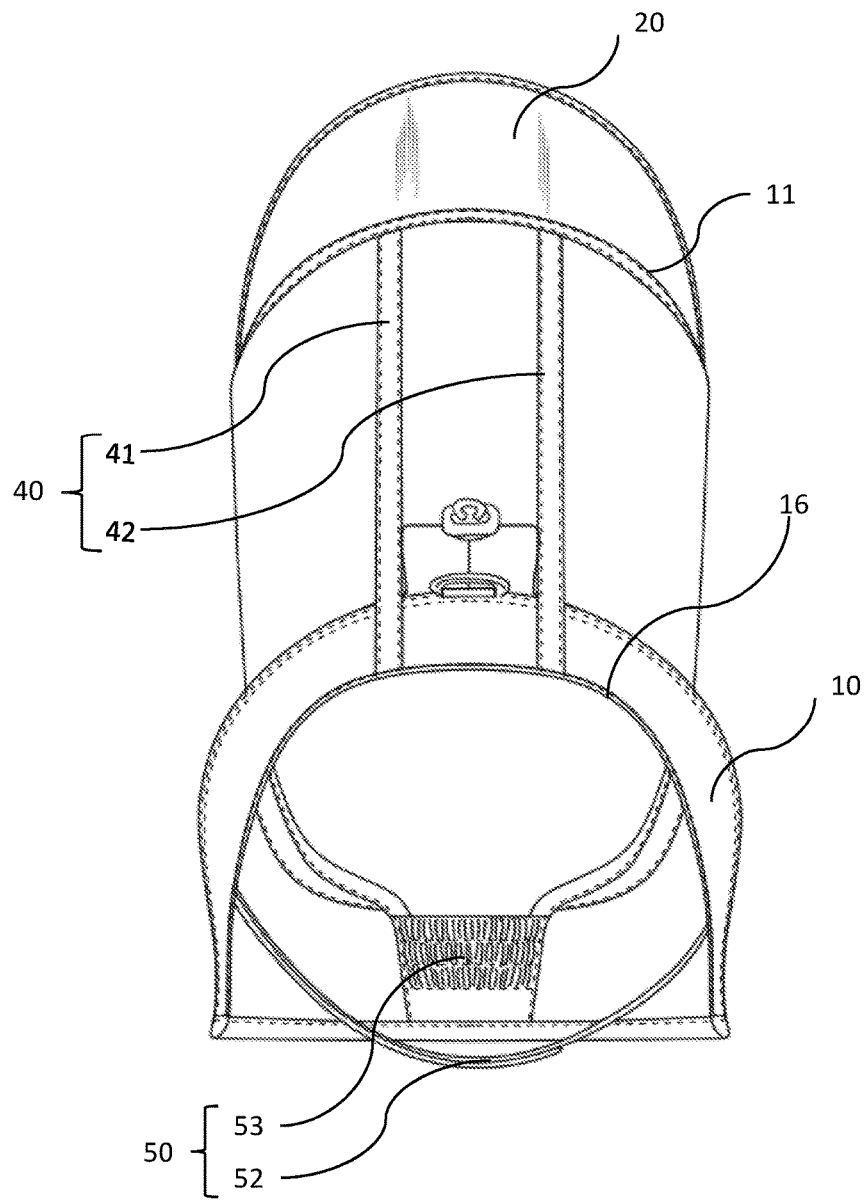
FIG. 5 shows a rear elevation view of the raincoat for dogs.
Figure 6:
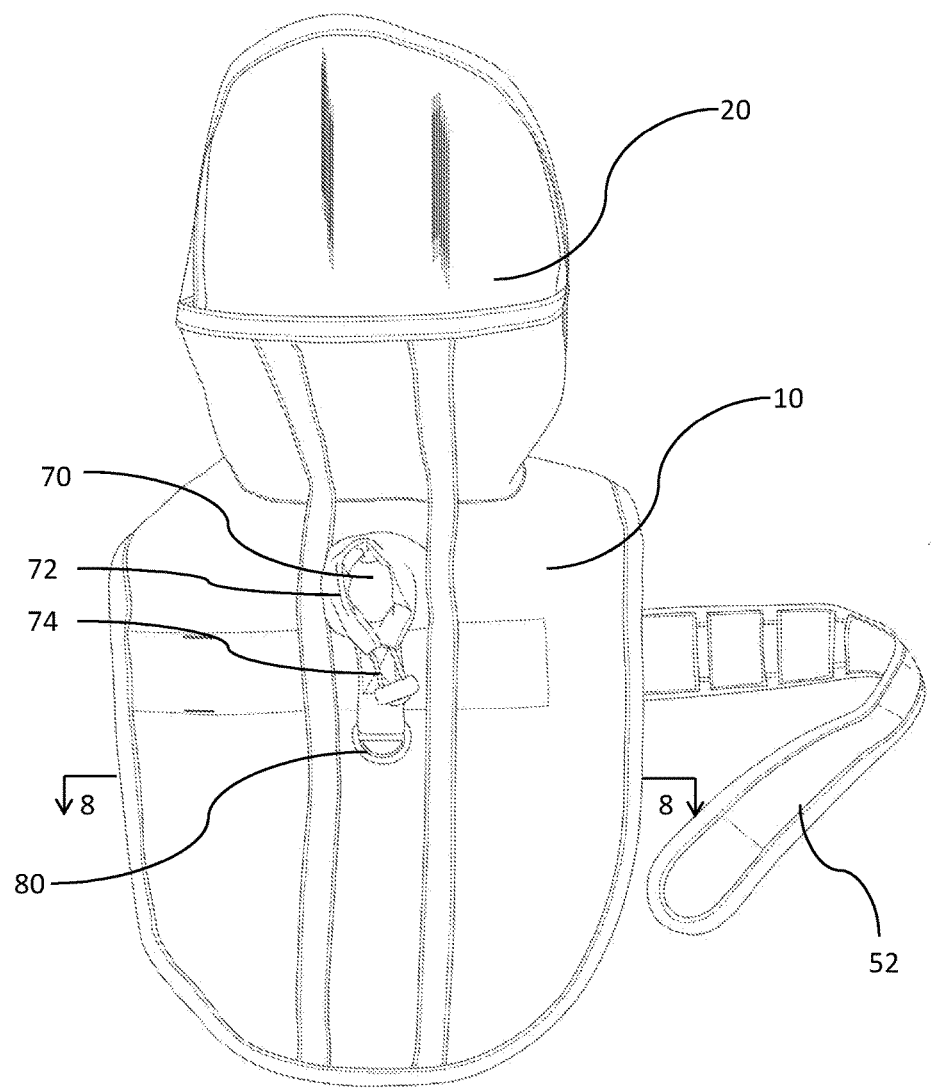
FIG. 6 shows a top plan view of the raincoat for dogs having an adjustable torso straps.
Figure 7:
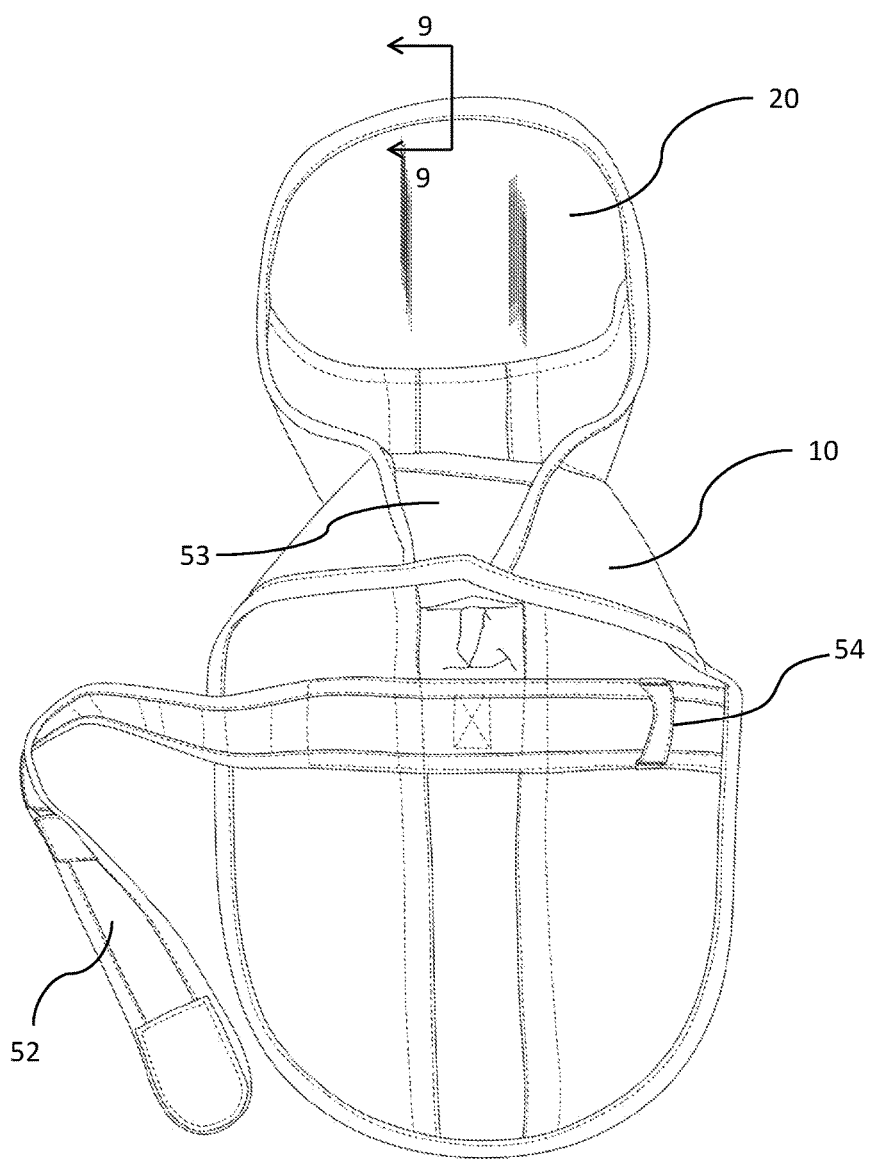
FIG. 7 shows a bottom plan view of the raincoat for dogs having an adjustable torso straps.

FIG. 5 shows a rear elevation view of the raincoat (100) for dogs. FIGS. 6 and 7 respectively show top and bottom plan views of the raincoat (100) for dogs showing an adjustable torso strap (52) one end of which is detached from a body portion (10) of the raincoat (100).

The fastening means (50) may include an adjustable torso strap (52) fixedly attached to the body portion (10). Preferably, the adjustable torso strap (52) may be hook and loop fastener strips (54), such as Velcro™ or fastener strips, which are sewn to the body portion (10) of the raincoat (100). Snap fastener, belt or other types of fastening means (50) may be used as long as it can fasten and secure the raincoat (100) to a dog (200).

Figure 14:
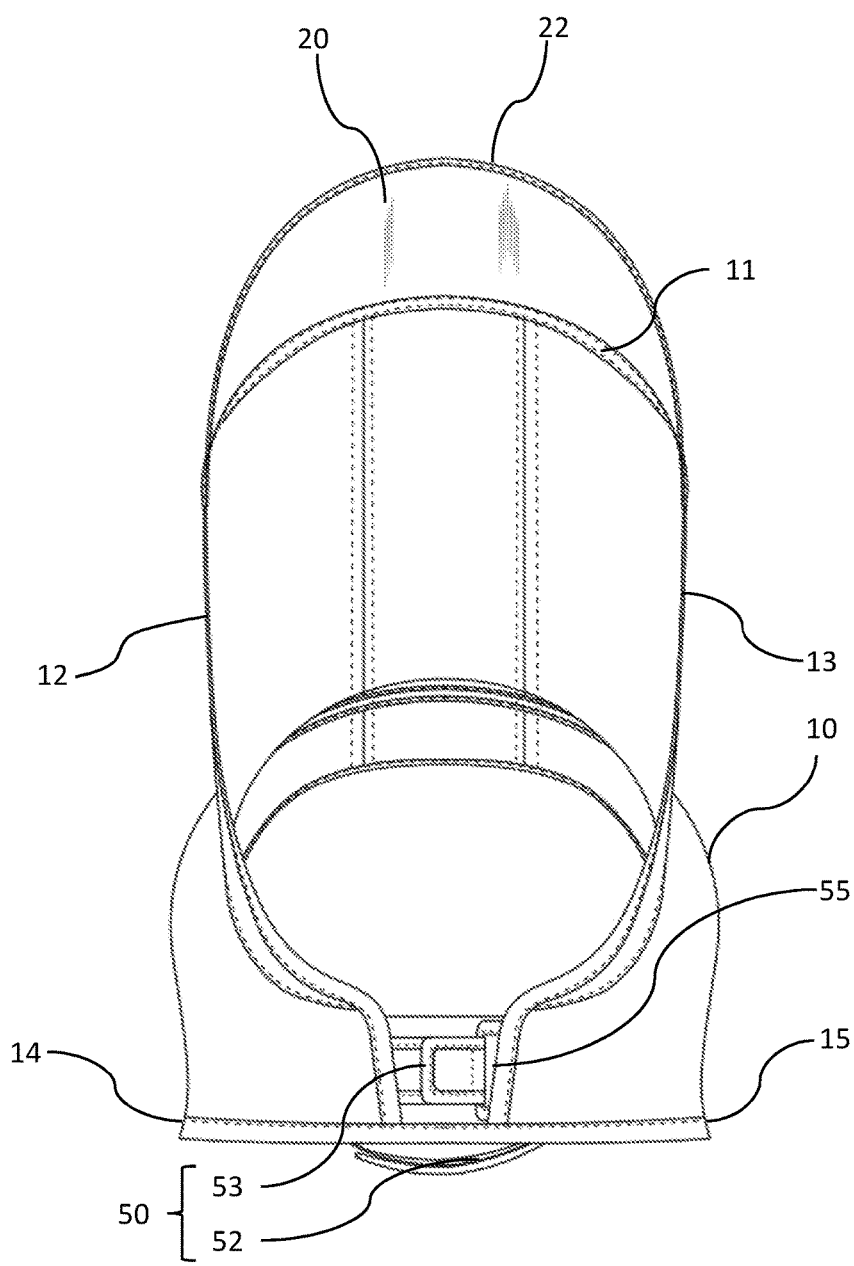
FIG. 14 shows a fron elevation view of the raincoat for dogs.

Furthermore, the fastening means (50) may further comprise an adjustable neck or chest strap (53) attached to the body portion (10) for fastening arid securing the body portion (10) to a neck or chest of the dog (200). Preferably, as shown in FIG. 14, the adjustable neck or chest strap (53) may include hook and loop fastener strips (55) such as Velcro™ and fastener strips, which are sewn to the body portion (10) of the raincoat (100).

Alternatively, the raincoat for dogs may further comprise a neck or chest strap (53) fixedly attached to the first and second front side edges (12 and 13) of the body portion (10).

Figure 10:
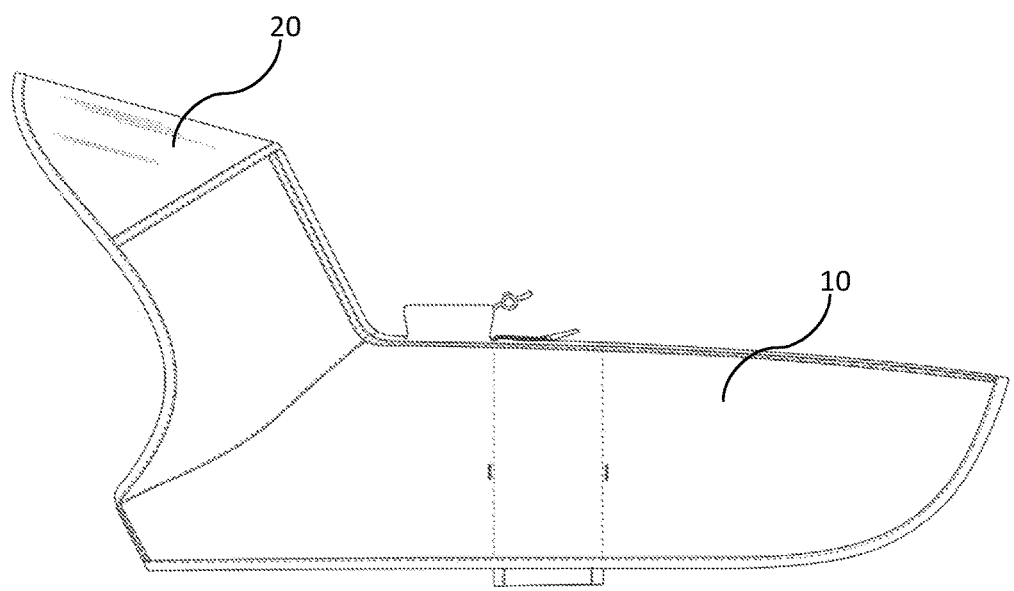
FIG. 10 shows a right side elevational view of the raincoat for dogs.
Figure 11:
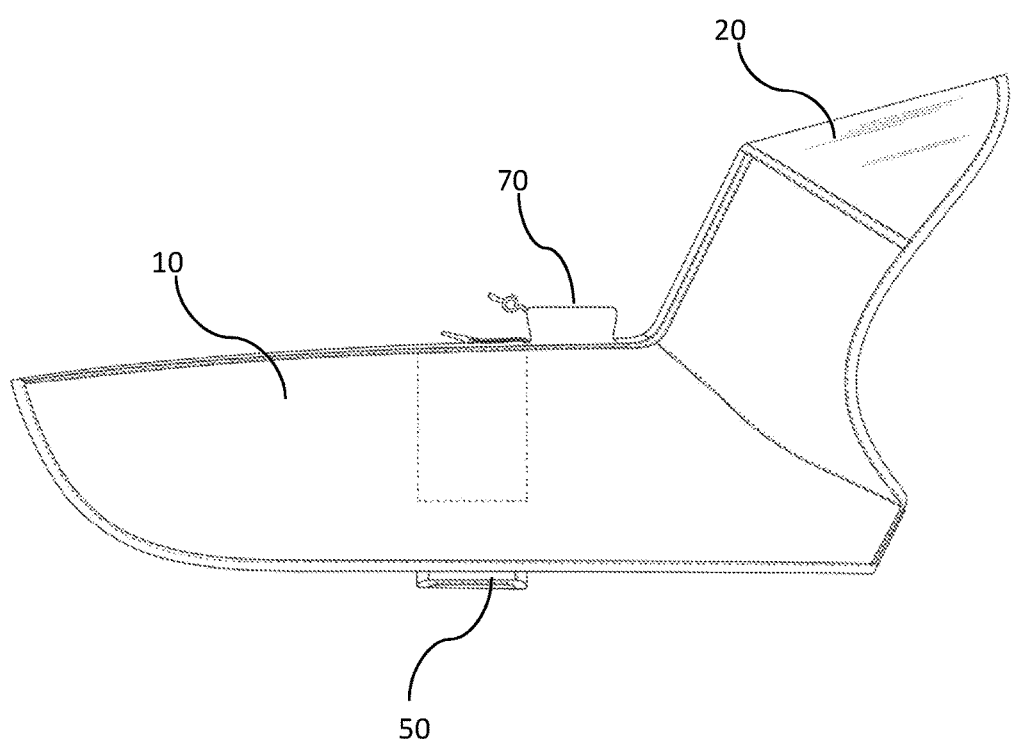
FIG. 11 shows a left side elevational view of the raincoat for dogs.
Figure 12:
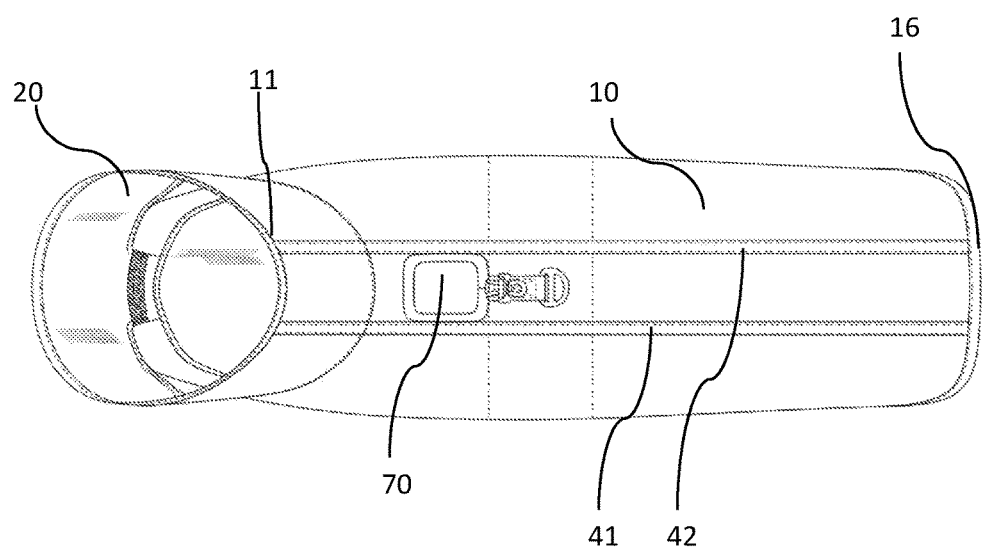
FIG. 12 shows a top plan view of the raincoat for dogs with the adjustable torso straps fastened.
Figure 13:
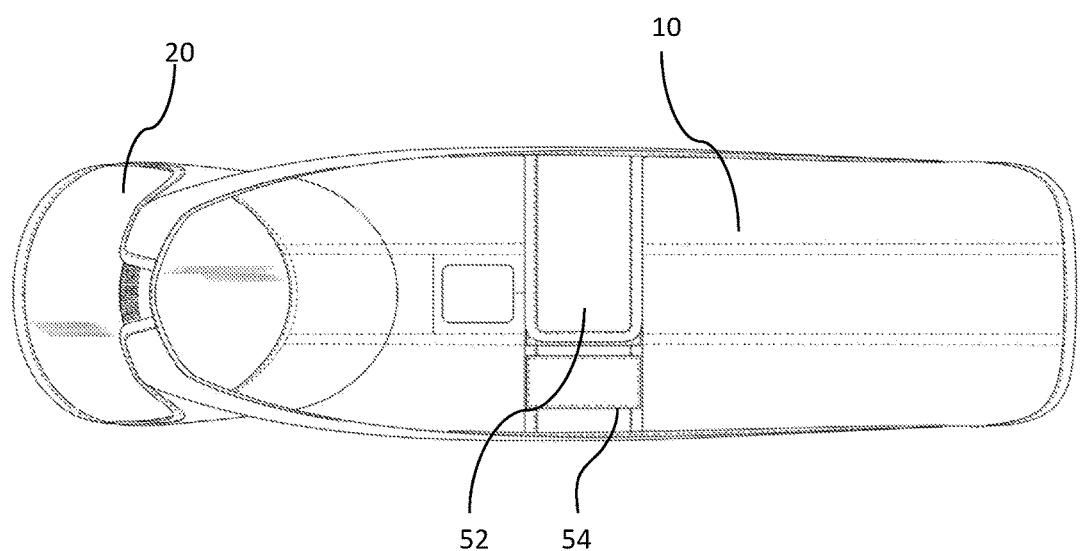
FIG. 13 shows a bottom plan view of the raincoat for dogs with the adjustable torso straps fastened.

FIGS. 10 and 11 respectively show right and left side elevational views of the raincoat (100) for dogs. FIGS. 12 and 13 show top and bottom plan views of the raincoat (100) for dogs showing the adjustable torso straps (52) which are fastened to a body portion (10) of the raincoat (100).

The raincoat (100) for dogs (100) may further comprise an access opening (70) formed on a top side (17) of the body portion (10) for attachment of a leash or harness to the dog (200) and passage thereof through the access opening (70). A drawstring (74) may be inserted in a drawstring sleeve (72) formed along the access opening (70).

As shown in FIGS. 6 and 13, the raincoat (100) for dogs may further comprise a D-ring (80) fixedly attached to the top side (17) of the body portion (10) for attachment of a leash (90) to the D-ring (80).

Preferably, the visor (20) may be made from a transparent or translucent flexible material.

In the alternative embodiment, a raincoat (100) for dogs (200) may comprise a body portion (10) that substantially covers and extends from a rump (210) to a head of a dog (200), wherein the body portion (10) may be waterproof and the body portion (10) may comprise a front edge (11), first and second front side edges (12 and 13), and a rear edge (16); a visor (20) fixedly attached to the front edge (11) of the body portion (10); a pliable metal wire (30) that may be attached to the body portion (10) along a spinal line (230) of the dog (200), wherein the pliable metal wire (30) substantially extends from the front edge (11) to the rear edge (16) of the body portion (10); and a fastening means (50) for fastening and securing the raincoat (100) to the dog (200). The pliable metal wire (30) may be attached to the body portion (10) directly or indirectly. In addition, the pliable metal wire (30) may be attached to the body portion (10) fixedly or movably.

The raincoat (100) for dogs may further comprise a sleeve (40) that substantially may extend from the front edge (11) to the rear edge (16) of the body portion (10), wherein the pliable metal wire (30) may be inserted into the sleeve (40), and wherein the sleeve (40) may be formed by stitching a strip (45) of waterproof material to the body portion (10).

As shown in FIGS. 4 and 9, a second pliable metal wire (60) may be attached to the body portion (10) and the visor (20) substantially along the rim (22) of the visor (20) and the first and second front side edges (12 and 13) of the body portion (10).

As shown FIGS. 5 and 7, the fastening means (50) may comprise an adjustable torso strap (52) fixedly attached to the body portion (10). The fastening means (50) may further comprise an adjustable neck or chest strap (53) attached to the body portion (10) for fastening and securing the body portion (10) to a neck or chest of the dog (200).

The raincoat for dogs may further comprise a neck or chest strap (53) fixedly attached to the first and second front side edges (12 and 13) of the body portion (10). Preferably, the adjustable torso strap (52) and a neck or chest strap (53) may include hook and loop fastener strips (54), such as Velcro™ and fastener strips, which are sewn to the body portion (10) of the raincoat (100).

As shown in FIGS. 6, 13, and 15, the raincoat (100) for dogs may further comprise an access opening (70) formed on a top side (17) of the body portion (10) for attachment of a leash (90) or harness (91) to the dog (200) and passage thereof through the access opening (70).

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A raincoat (100) for dogs (200), comprising:
   a body portion (10) that substantially covers and extends from a rump (210) to a head (220) of a dog (200), wherein the body portion (10) is waterproof and the body portion (10) comprises a front edge (11), first and second front side edges (12 and 13), first and second side edges (14 and 15) and a rear edge (16);
   a visor (20) fixedly attached to the front edge (11) of the body portion (10);
   first and second pliable metal wires (31 and 32) that are parallel to each other and attached to the body portion (10) along a spinal line (230) of the dog (200), wherein the first and second pliable metal wires (31 and 32) substantially extend continuously from the front edge (11) of the body portion (10) to the rear edge (14) of the body portion (10); and
   a fastening means (50) for fastening and securing the raincoat (100) to the dog (200).

2. The raincoat for dogs of claim 1, further comprising first and second sleeves (41 and 42) that substantially extend from the front edge (11) of the body portion (10) to the rear edge (16) of the body portion (10), wherein the first and second pliable metal wires (31 and 32) are respectively inserted into the first and second sleeves (41 and 42).

3. The raincoat for dogs of claim 2, wherein the first and second sleeves (41 and 42) are formed by stitching strips (45) of waterproof material to the body portion.

4. The raincoat for dogs of claim 1, wherein a third pliable metal wire (60) is attached to the body portion (10) and the visor (20) substantially along a rim (22) of the visor (20) and the first and second front side edges (12 and 13) of the body portion (10).

5. The raincoat for dogs of claim 1, wherein the first and second pliable metal wires (31 and 32) are attached on both sides of the spinal line (230) of the dog (200) and substantially equally spaced apart from the spinal line (230) of the dog (200).

6. The raincoat for dogs of claim 1, wherein the fastening means (50) comprises an adjustable torso strap (52) fixedly attached to the body portion (10).

7. The raincoat for dogs of claim 6, wherein the adjustable torso strap (52) includes hook and loop fastener strips (54).

8. The raincoat for clogs of claim 6, wherein the fastening means (50) further comprises an adjustable neck or chest strap (53) attached to the body portion (10) for fastening and securing the body portion (10) to a neck (240) or chest (250) of the dog (200).

9. The raincoat for dogs of claim 6, wherein the adjustable neck (240) or chest strap (250) includes hook and loop fastener strips (55).

10. The raincoat for dogs of claim 1, further comprising a neck or chest strap fixedly attached to the first and second front side edges (12 and 13) of the body portion (10).

11. The raincoat for dogs of claim 1, further comprising an access opening (70) formed on a top side (17) of the body portion (10) for attachment of a leash (90) or harness (91) to the dog (200) and passage thereof through the access opening (70).

12. The raincoat for dogs of claim 11, wherein a drawstring (74) is inserted in a drawstring sleeve (72) termed along the access opening (70).

13. The raincoat for dogs of claim 1, farther comprising a D-ring (80) fixedly attached to a top side (17) of the body portion (10) for attachment of a leash (90) to the D-ring (80).

14. The raincoat for dogs of claim 1, wherein the visor (20) is made from a transparent or translucent flexible material.

15. A raincoat (100) for dogs (200), comprising:
- a body portion (10) that substantially covers and extends from a rump (220) to a head (210) of a dog (200), wherein the body portion (10) is waterproof and the body portion (10) comprises a front edge (11), first and second front side edges (12 and 13), and a rear edge (14);
- a visor (20) fixedly attached to the front edge (11) of the body portion (10);
- a pliable metal wire (30) that is attached to the body portion (10) along a spinal line (230) of the dog (200), wherein the pliable metal wire (30) substantially extend continuously from the front edge (11) of to the rear edge (14) of the body portion (10) and
- a fastening means (50) for fastening and securing the raincoat (100) to the dog (200).

16. The raincoat for dogs of claim 15, further comprising a sleeve (40) that substantially extends from the front edge (11) of the body portion (10) to the rear edge (16) of the body portion (10), wherein the pliable metal wire (30) is inserted into the sleeve (40), and wherein the sleeve (40) is formed by stitching a strip (45) of waterproof material to the body portion (10).

17. The raincoat for dogs of claim 15, wherein a second pliable metal wire (60) is attached to the body portion (10) and the visor (20) substantially along a rim (22) of the visor (20) and the first and second front side edges (12 and 13) of the body portion (10).

18. The raincoat for dogs of claim 15, wherein the fastening means (50) comprises an adjustable torso strap (52) fixedly attached to the body portion (10), and wherein the fastening means (50) further comprises an adjustable neck or chest strap (53) attached to the body portion (10) for fastening and securing the body portion (10) to a neck (240) or chest (250) of the dog (200).

19. The raincoat for dogs of claim 15, further comprising a neck or chest strap (53) fixedly attached to the first and second front side edges (12 and 13) of the body portion (10).

20. The raincoat for dogs of claim 15, further comprising an access opening (70) formed on a top side (17) of the body portion (10) for attachment of a leash (90) or harness to the dog (200) and passage thereof through the access opening (70).

* * * * *